United States Patent Office 3,285,909
Patented Nov. 15, 1966

3,285,909
1-AZIRIDINO-1-(DI-LOWER ALKYLAMINO)-ETHANE
Warren J. Rabourn, Pasadena, Tex., assignor to The Dow Chemical Company, Midland, Mich., a corporation of Delaware
No Drawing. Filed June 4, 1965, Ser. No. 461,499
3 Claims. (Cl. 260—239)

This application is a continuation-in-part of my copending application Serial No. 155,534, filed November 24, 1961, now issued as Patent No. 3,236,835.

The present invention relates to ethylidenediamines having the formula $$A-CH(CH_3)A'$$

wherein A represents a 1-aziridinyl radical and A' represents a dialkylamino, dialkenylamino, alkylalkenylamino or morpholino radical or a radical having the formula $$\underset{\underline{\qquad\qquad\qquad}}{CH_2-(CH_2)_n-N-}$$

wherein $n$ is an integer from 1 to 5. Thus, they can be represented by the formula $$\begin{array}{c} R \\ \diagdown \\ R_1 \end{array} N-\underset{\underset{}{|}}{\overset{CH_3}{\overset{|}{C}H}}-N \begin{array}{c} R_2 \\ \diagup \\ R_3 \end{array}$$

wherein in this and succeeding formulas R, $R_1$, $R_2$ and $R_3$ are the same or different organic radicals and wherein either the pair R and $R_1$ or the pair $R_2$ or $R_3$, or both, are joined together to form with the N— to which they are attached an aziridinyl radical and the other pair may be joined to form a morpholino radical or a radical having the formula $$\underset{\underline{\qquad\qquad\qquad}}{CH_2-(CH_2)_n-N-}$$

wherein $n$ has the aforesaid meaning.

Compounds of the above type are produced by the reaction of a secondary amine, $R_2NHR_3$, with a vinylamine having the formula $$\begin{array}{c} R \\ \diagdown \\ R_1 \end{array} N-CH=CH_2$$

The reaction with the vinylamine is a simple addition to the vinyl double bond:

$$\begin{array}{c} R \\ \diagdown \\ R_1 \end{array} N-CH=CH_2 + HN \begin{array}{c} R_2 \\ \diagup \\ R_3 \end{array} \longrightarrow \begin{array}{c} R \\ \diagdown \\ R_1 \end{array} N-\underset{\underset{}{|}}{\overset{CH_3}{\overset{|}{C}H}}-N \begin{array}{c} R_2 \\ \diagup \\ R_3 \end{array}$$

Vinylamines suitable for use as the reactant in the above equation include the dialkylvinylamines wherein the alkyl radicals are the same or different, the alkenylalkylvinylamines, the dialkenylvinylamines, the N-vinylazacycloalkanes, and the like. Specific amines include dimethylvinylamine, methylethylvinylamine, diethylvinylamine, dibutylvinylamine, dioctylvinylamine, diallylvinylamine, allylmethylvinylamine, dihexenylvinylamine, octylcrotylvinylamine, di(methallyl)vinylamine, N-vinyl - aziridine, -azetidine, -pyrrolidine, -piperidine, -azacycloheptane, and the like.

Amines suitable for use as the second reactant in the above reaction include dialkylamines, alkylalkenylamines, dialkenylamines, azacycloalkanes, and the like. Thus, one can use dimethylamine, diethylamine, dihexylamine, dioctylamine, methylbutylamine, butylallylamine, amylmethallylamine, diallylamine, dicrotylamine, dioctenylamine, and the like, aziridine, azetidine, pyrrolidine, morpholine and the like.

In addition to the above second group of amines, various di-secondary-amines free of interfering groups can be used in the process of the invention. Among such are piperazine, and N,N'-dialkyl-alkylenediamines; for example, N, N'-dimethyl- or dibutyl-ethylenediamine or -propylenediamine. When such diamines are used, the resulting product may be the bis(1-aminoethyl)ethylenediamine formed by a reaction analogous to that shown by the above equation or, if the configuration of the diamine is such as to favor ring closure, an imidazolidine or analogous heterocyclic product. Thus, from piperazine the product having the following formula can be made:

$$\begin{array}{c} R \\ \diagdown \\ R_1 \end{array} N-\underset{\underset{}{|}}{\overset{CH_3}{\overset{|}{C}}}-N \diagdown\underline{\quad\quad}\diagup N-\underset{\underset{}{|}}{\overset{CH_3}{\overset{|}{C}H}}-N \begin{array}{c} R \\ \diagup \\ R_1 \end{array}$$

Further reaction with additional piperazine produces polymeric resins. Similarly, N,N'-dimethylethylenediamine produces initially a product having the formula $$\begin{array}{c} R \\ \diagdown \\ R_1 \end{array} N-\underset{\underset{}{|}}{\overset{CH_3}{\overset{|}{C}H}}-\underset{\underset{}{|}}{\overset{CH_3}{\overset{|}{N}}}-CH_2CH_2NHCH_3$$

or $$\begin{array}{c} R \\ \diagdown \\ R_1 \end{array} N-\underset{\underset{}{|}}{\overset{CH_3}{\overset{|}{C}H}}-\underset{\underset{}{|}}{\overset{CH_3}{\overset{|}{N}}}-CH_2CH_2-\underset{\underset{}{|}}{\overset{CH_3}{\overset{|}{N}}}-\underset{\underset{}{|}}{\overset{CH_3}{\overset{|}{C}H}}-N \begin{array}{c} R \\ \diagup \\ R_1 \end{array}$$

depending on the proportions of reactants used. The first of these products can be cyclized to produce the corresponding imidazolidine by an intramolecular amine interchange:

$$\begin{array}{c} R \\ \diagdown \\ R_1 \end{array} N-\underset{\underset{}{|}}{\overset{CH_3}{\overset{|}{C}H}}-\underset{\underset{}{|}}{\overset{CH_3}{\overset{|}{N}}}-CH_2CH_2NHCH_3 \longrightarrow H_3C-N\underset{\underset{CH_3}{\overset{|}{CH}}}{\overset{CH_2-CH_2}{\diagdown\diagup}}N-CH_3$$

Because of the ease with which this cyclization occurs, the imidazolidine is usually the principal product actually isolated from the above reaction.

The above vinylamine reaction proceeds vigorously at room temperature without any catalyst. Since it is strongly exothermic, it is usually advisable to provide cooling means to control the temperature during the mixing of the reactants. The amine interchange reaction is slower but proceeds readily without a catalyst at temperatures of 20–100° C.

The processes of the invention are especially useful for the preparation of unsymmetrical ethylidenediamines; that is, products having the formula shown above wherein $R_2$ and $R_3$ are not the same as R and $R_1$, respectively, this being a genus for which no practical synthesis has heretofore been available.

The practice of the invention is illustrated by the following examples.

Example 1

One-half mole of N,N-dimethylvinylamine was mixed at room temperature with one-half mole of aziridine and the mixture was allowed to stand 18 hours, after which the reaction mixture was fractionally distilled under reduced pressure to isolate the corresponding 1-(dimethylamino)-1-(1-aziridinyl) ethane.

The product, obtained in 71% yield, had B.P., 33° C. (20 mm.); $N_D^{25}$, 1.4315; $d_4^{25}$, 0.835.

Example 2

The procedure of Example 1 was repeated except that diethylvinylamine was used instead of dimethylvinylamine, thus producing 1-(diethylamino)-1-(1-aziridinyl) ethane in 68% yield. It had B.P., 57° C. (25 mm.); $N_D^{25}$, 1.4350 and $d_4^{25}$, 0.834.

When the dimethyl- and diethylvinylamines used in the above examples are replaced with other N,N-dialkylvinylamines, the corresponding dialkylaminoaziridinylethane is produced. Thus, di-n-propylvinylamine produces 1-(di-n-propylamino)-1-(1-aziridinyl)-ethane and the dibutylvinylamines produce the corresponding 1-(dibutylamino)-1-(1-aziridinyl) ethanes. Likewise, the use of 2-alkylaziridine, such as 2-methylaziridine, instead of unsubstituted aziridine produces the corresponding homologous dialkylamino-1-[1-(2-alkylaziridinyl)] ethane.

Alternatively, the above 1-dialkylamino-1-(1-aziridinyl) ethane can be prepared by the addition of the appropriate dialkylamine to N-vinylaziridine, the procedure and results being substantially as shown in the above example. Thus, for instance, the product of Example 1 is obtained by the addition of dimethylamine to N-vinylaziridine.

Other non-aromatic secondary amines free of reactive substituents can be used instead of the secondary amines shown above, the products being the corresponding ethylidenediamines. Such secondary amines include dipropylamine, dibutylamine, methylethylamine, allylpropylamine, alkyl-substituted arizidines, pyrrolidines, piperidines, morpholines, piperazines and the like wherein the alkyl radicals are attached to a carbon atom in the ring, and in general, the non-aromatic secondary amines.

While the above examples show the use of dimethyl- or diethylvinylamine as one of the reactants, other vinyl tertiary amines can be used similarly to prepare as corresponding ethylidenediamines. Suitable amines include dipropyl-, dibutyl- and other dialkylvinylamines, diallyl-, propylallyl- and butylallylvinylamines, heterocyclic non-aromatic vinylamines, such as N-vinyl-aziridine, -pyrrolidine, -piperidine, -morpholine, and the like, and in general, any N-vinyl tertiary amine free of interfering substituents. Many of these vinyl tertiary amines are known and others can be made by the same general procedures used for the known compounds. Others can be made by the procedures disclosed in British Patent 832,078 or those described in United States Patent 3,149,164.

The ethylidenediamines of the invention are useful for a wide variety of purposes. They contain two basic tertiary amino groups. These make the compounds useful as organic bases. Such bases are widely used as absorbers for acid gases, such as carbon dioxide, hydrogen chloride and hydrogen sulfide, and as catalysts for a wide variety of chemical reactions. By thermal decomposition at about 250–400° C. they lose one amino group and produce an N-vinyl tertiary amine which may be different from that used in the above synthesis. The latter, in turn, can be catalytically hydrogenated to produce the corresponding N-ethyl tertiary amines, a class for which no other practical general synthesis is available.

In addition to the above uses, the novel compounds of the invention are useful as pesticides, including such diverse activities as insecticides, rodenticides, and nematocides. Thus, for example, 1-aziridinyl-1-dimethylaminoethane, the product of Example 1, is 100% effective in killing mice when fed at a dosage of 0.1 g. per kilogram of animal weight.

The ethylidenediamines of the invention are useful as chemical intermediates. For instance, they can be used to make vinylamines as disclosed in my copending application cited above. Such vinylamines are valuable monomers which can be polymerized and copolymerized by conventional techniques used with other N-vinyl compounds. The compounds of the invention can also be cleaved to make the corresponding N-halomethyl-tertiary-amines as taught by Bohme and Hartke, Ber. 93, 1305 (1960).

I claim:
1. A 1-dialkylamino-1-(1-aziridinyl) ethane wherein each alkyl group of the dialkylamino radical contains 1 to 4 carbon atoms.
2. The compound of claim 1 wherein each alkyl group is a methyl group.
3. The compound of claim 1 wherein each alkyl group is an ethyl group.

No references cited.

ALEX MAZEL, *Primary Examiner.*

ALTON D. ROLLINS, *Assistant Examiner.*